United States Patent [19]

Lange

[11] Patent Number: 4,899,982
[45] Date of Patent: Feb. 13, 1990

[54] UPPER VALVE COMPONENT

[75] Inventor: Peter Lange, Lüdenscheid, Fed. Rep. of Germany

[73] Assignee: Flühs Drehtechnik GmbH, Lüdenscheid, Fed. Rep. of Germany

[21] Appl. No.: 236,353
[22] PCT Filed: Oct. 30, 1987
[86] PCT No.: PCT/DE87/00491
  § 371 Date: Jul. 7, 1988
  § 102(e) Date: Jul. 7, 1988
[87] PCT Pub. No.: WO88/03625
  PCT Pub. Date: May 19, 1988

[30] Foreign Application Priority Data

Nov. 8, 1986 [DE] Fed. Rep. of Germany ....... 3638180

[51] Int. Cl.[4] .................. F16K 41/08; F16K 43/00; F16J 15/32
[52] U.S. Cl. .................. 251/214; 277/152; 277/165; 277/212 C; 277/212 F; 137/315
[58] Field of Search .......... 137/270, 315, 454.5, 137/454.6, 625.31, 625.33; 251/205, 208, 214, 330, 331, 335.2; 277/116.2, 165, 151, 152, 153, 189, 212 R, 212 F, 212 FB, 212 C, 208, 209

[56] References Cited

U.S. PATENT DOCUMENTS

| 2,986,372 | 5/1961 | Yocum | 251/214 |
| 3,322,475 | 5/1967 | Schick | 277/212 R |
| 3,682,490 | 8/1972 | Lunt | 251/214 |
| 3,840,048 | 10/1974 | Moen | 137/454.6 |
| 4,125,265 | 11/1978 | Grzesiak | 277/189 |
| 4,280,741 | 7/1981 | Stoll | 277/152 |
| 4,304,416 | 12/1981 | Oshima | 277/165 |
| 4,324,318 | 4/1982 | Karasudani | 277/212 FB |
| 4,651,770 | 3/1987 | Denham et al. | 137/270 |
| 4,695,061 | 9/1987 | Meisner et al. | 251/214 |
| 4,793,375 | 12/1988 | Marty | 137/270 |

FOREIGN PATENT DOCUMENTS

| 2646781 | 4/1978 | Fed. Rep. of Germany | 251/214 |
| 3127713 | 2/1983 | Fed. Rep. of Germany | 251/214 |

Primary Examiner—George L. Walton
Attorney, Agent, or Firm—Spencer & Frank

[57] ABSTRACT

An upper valve component for a sanitary fixture including a sleeve type head fastenable in a valve housing and a spindle which extends through the center of the sleeve head and is equipped with a socket head, the spindle having exterior annular faces which radially position it within the sleeve head. The exterior annular face of the spindle includes a number of annular grooves therearound, some of which are provided with sealing rings to seal the spindle within the sleeve head. At the end of the sleeve head which is proximate the socket head of the spindle, there is an internal annular recess. The valve component includes a pretensioned elastic bearing which is insertable into the annular recess between the spindle and the sleeve head can be removed or inserted without disassembly of the valve. The bearing has an external surface which presses against the internal surface of the recess and has an internal surface which bears against the spindle. The bearing also includes a flange extending inwardly for locking engagement with one of the annular grooves in the spindle to inhibit rotation of the spindle.

8 Claims, 2 Drawing Sheets

UPPER VALVE COMPONENT

FIELD OF THE INVENTION

The invention relates to an upper valve component for sanitary fixtures, the component including a sleeve-like head fastenable in a valve housing and a rotatable spindle penetrating the center of the head and equipped with a socket head. Annular faces with which the spindle is radially guided in the head and grooves interrupting the annular faces, some of them accommodating sealing rings, are provided on the exterior of the spindle.

PRIOR ART

Upper valve components of the above-mentioned type are known from DE-C-3,207,895 and DE-A-3,323,008. The following problem occurs in connection with the prior art upper valve components: a slight amount of radial play exists between the spindle and the head and this is transferred by way of the socket head to the pressed-on handle of the fixture and—since the handle has a significantly larger radius than the spindle—gives the impression of a considerable amount of play. Moreover, if such fixtures having upper valve components are mounted horizontally on a wall and have heavy asymmetrical handles which thus exert a torque on the spindle of the upper valve component, it may happen that the handles pivot automatically from a radially upper position to a radially lower position when the valve is open.

DESCRIPTION OF THE INVENTION

The invention is intended to remedy this situation. It is the object of the invention to configure an upper valve component of the above-mentioned type in such a manner that play between spindle and head as well as undesired pivoting movements between spindle and head are avoided. This is accomplished according to the invention in that, on its inner edge facing the socket head, the head is provided with an annular recess into which is pressed an essentially sleeve-shaped, pre-tensioned bearing of limited elasticity so that it rests against one of the annular faces of the spindle and is in locking engagement with one of the grooves.

The pre-tensioned bearing prevents play between spindle and head in the radial direction as well as the inadvertent pivoting of the spindle in the head, even if the upper valve component is installed horizontally and a heavy asymmetrical fixture handle is employed. A further advantage of the invention is that the bearing takes over the function of the elastic packing as well as that of one of the sealing rings.

BRIEF DESCRIPTION OF THE DRAWINGS

One embodiment of the invention is illustrated in the drawing figures and will be described in greater detail below. It is shown in.

BEST MODE OF IMPLEMENTATION OF THE INVENTION

Figure 1:
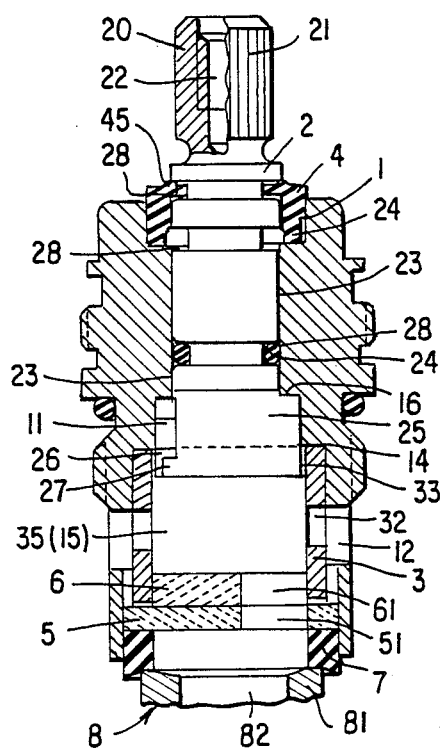
FIG. 1, a longitudinal sectional view of an upper valve component.

The upper valve component selected as the embodiment is screwed into the housing of a sanitary fixture, of which only part of the water intake channel is shown.

The upper valve component includes a head 1, a spindle 2 penetrating the center of the head 1 and radially guided therein as well as a driver 3 which is form-lockingly connected with the spindle 2 and is radially guided in head 1. Between head 1 and spindle 2, on the side facing away from the water inlet, there is disposed a bearing 4. On the side of the water inlet, in the region of its end face, head 1 carries a first valve seat disc 5 of a ceramic material and a sealing ring 7 which projects beyond its end face. On the water inlet side, a second valve seat disc 6 of ceramic material is provided at the end face of driver 3.

Head 1 has the shape of a sleeve, i.e. it is composed of a rotationally symmetrical hollow body with, however, differing inner diameters, and its two end faces are open. In its interior, essentially in its center, head 1 has two axially spaced shoulders 14, 16. Spindle 2 is essentially solid and includes a socket head 20 in a multi-edge configuration 21 which is provided in its interior with an internally threaded blind bore 22 for fastening a handle (not shown). On its exterior, spindle 2 is provided with annular faces 23 with which spindle 2 is radially guided in head 1. These annular faces 23 are interrupted by grooves 28. In the groove on the water inlet side, a sealing ring 24 is accommodated which takes over part of the sealing function between spindle 2 and head 1.

In the region between shoulder 16 and the end face facing socket head 20, the interior of head 1 is configured as a hollow cylinder for guidance of spindle 2. On the side of its inner edge facing socket head 20, head 1 is provided with an annular recess 17. Bearing 4 is inserted in this recess 17. Bearing 4 is pre-tensioned and of limited elasticity. It is manufactured, for example, of a mixture of polyamide and molybdenum. Bearing 4 is pressed into a groove 28 on the side of the socket head so as to lie against one of the annular faces 23 of spindle 2 and be lockingly held in the groove.

Figure 2:
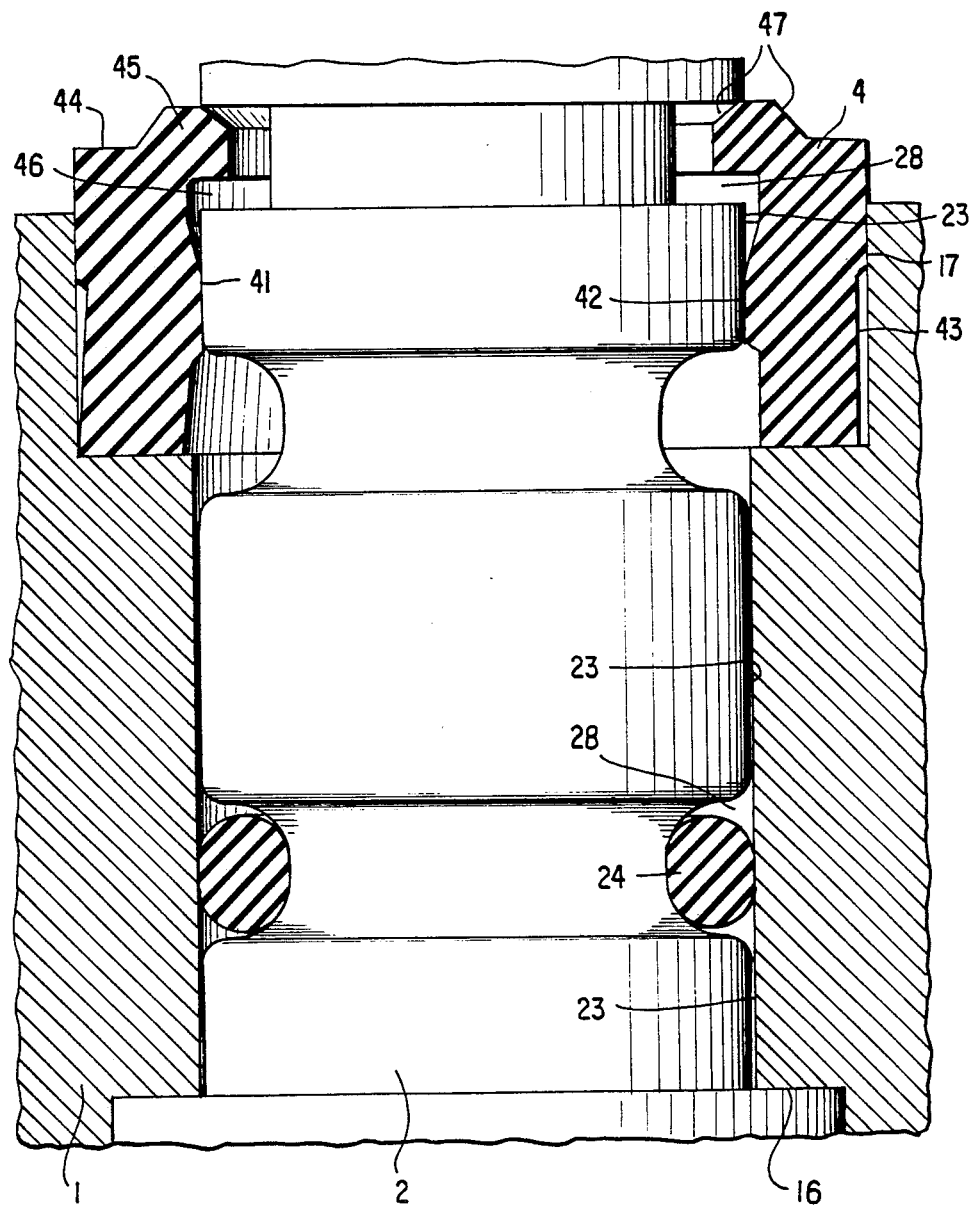
FIG. 2, an enlarged sectional view to a scale of 5:1 of FIG. 1 in the region of the bearing.

In its region 41 lying against one of the annular faces 23 of spindle 2, bearing 4, before it is pressed in, has an inner diameter which is smaller than the outer diameter of annular face 23. This region is shown on the right side of FIG. 2 as a "negative field" 42. At its outer edge facing away from socket head 20, bearing 4 is provided with a cylinder jacket type recess 43. After pressing bearing 4 into recess 17 of head 1—shown in the left half of FIG. 2—region 41 is compressed to an inner diameter which is equal to the outer diameter of annular face 23. Since bearing 4 must yield, the cancellation of negative field 42 causes the outer edge of bearing 4 on the side of the water inlet to lie against the adjacent inner edge of recess 17 in head 1; simultaneously the contact pressure increases in the region between recess 43 of bearing 4 and the end face of recess 17 in head 1 facing away from socket head 20. The deformed region created by displacement of negative field 42, ensures, on the one hand, that there is a seal between spindle 2 and head 1; it takes the place of a further sealing ring. Additionally, the contact pressure prevents spindle 2 from inadvertently turning relative to head 1 eve if significant torques are applied as a result of a heavy, asymmetrical handle.

On its end face facing socket head 20, bearing 4 is provided with a contact face 44 in the shape of a circular ring for a press-in ring (not shown). With the aid of such a press-in ring, bearing 4 is pressed into head 1.

On its side facing socket head 20, an internal flange 45 is shaped onto bearing 4. The internal flange 45 lockingly engages in the outer one of grooves 28 of spindle 2. An annular hollow groove 46 is provided between the internal flange 45 engaged in groove 28 and contact face 44 pressing against annular face 23. The edges 47 of internal flange 45 are sloped. Internal flange 45 lockingly engages in the associated groove 28. Hollow groove 46 and sloped edges 47 facilitate the locking engagement. Bearing 4 and its internal flange 45 thus take over the function of an otherwise required elastic packing: bearing 4 prevents spindle 2 from falling out of head 1 on the water inlet side.

Spindle 2 is rotatable only within limits in head 1: following shoulder 16, head 1 is provided, on the side facing shoulder 14, with an inwardly projecting partial ring 11 whose end forms stops. On the side opposite socket head 20, a T-shaped transverse web 25 is formed on the exterior of spindle 2. The face of transverse web 25 facing socket head 20 lies against shoulder 16 of head 1. At its one end, transverse web 25 is provided with a recess 26 whose dimensions are equal to those of the stops at partial ring 11. Recess 26 is delimited by a projection 27 at the free end of transverse web 25. Transverse web 25 is rotatable in head 1 between the stops at partial ring 11.

An inwardly drawn, flange-like edge 33 of driver 3 is provided with receptacles into which engage, on the one hand, only projection 27 of spindle 2 and, on the other hand, transverse web 25 itself.

Following the end face facing the water inlet, head 1 is provided with passage openings 12. These passage openings 12 are formed by an annular slit which is partitioned by two longitudinal webs 15. Driver 3 is configured as a hollow cylindrical sleeve equipped with passage openings 32 in its walls. Passage openings 32 are formed by an annular slit partitioned by two longitudinal webs 35. Passage openings 32 in driver 3 and passage openings 12 in head 1 lie in the same transverse plane.

Valve seat disc 5 held by head 1 is circular when seen from the front. It is provided with a semicircular passage opening 51. On the side facing away from the water inlet, the second valve seat disc 6 lies against the first valve seat disc 5. It is likewise provided with a semicircular passage opening 61.

By way of the first stationary valve seat disc 5, head 1 presses sealing ring 7 onto a valve seat 81 in water inlet 82 of housing 8. Once head 1 has been fastened to the housing, the position of sealing ring 7 remains unchanged. Rotating spindle 2 causes driver 3 and together with it the second valve seat disc 6, which lies against it, to be rotated relative to the first valve seat disc 5 so that passage opening 51 in valve seat disc 5 is completely opened by valve seat disc 6 or is opened and closed to the desired degree. Incoming water flows out through passage openings 12 and 32 in head 1 and in driver 3.

I claim:

1. Upper valve component for sanitary fixtures including:
    a sleeve-type head fastenable in a valve housing
    a spindle which penetrates the center of the sleeve head and is equipped with a socket head, the exterior of said spindle being provided with annular faces with which the spindle is radially guided in the sleeve head and with grooves which interrupt the annular faces, some of them accommodating sealing rings, wherein at a first end proximate the socket head, the sleeve head is provided with an annular internal recess and
    an essentially sleeve-shaped, pre-tensioned bearing of limited elasticity for insertion into and removal from said annular recess between said spindle and said sleeve head, without disassembly of said spindle from said bearing with a first portion of said bearing radially bulged into contact with one of the annular faces of the spindle and a second portion seated in a locking engagement with one of the grooves with an opposite portion bulged into contact with the sleeve head wall of the annular recess, thereby inhibiting rotation of the spindle with respect to the sleeve head during application of torque thereto.

2. Upper valve component according to claim 1, wherein in its region provided for contact with one of the annular faces of the spindle, the bearing has an inner diameter which is smaller than the outer diameter of said annular face and on its outer edge facing away from the socket head, said bearing is provided with a cylinder jacket like recess.

3. Upper valve component according to claim 1 or 2, wherein at its end face facing the socket head, the bearing, is provided with a circumferential recess forming circular contact face.

4. Upper valve component according claims 1 or 2 or 3, wherein said second portion of said bearing faces the socket head and includes a shaped-on internal flange, which lockingly engages in said one of the grooves.

5. Upper valve component according to claim 4, wherein said one of said grooves has a first wall oriented at an angle with respect to said annular face, said internal flange including a sloped edge for contact with said first wall.

6. Upper valve component according to claims 4 or 5, wherein an annular hollow groove is provided between the internal flange and the portion pressed against the annular face.

7. Upper valve component according to claim 5, said internal flange including a second edge forming one surface of said circular contact face.

8. Upper valve component according to one of claims 1 to 6, wherein the bearing is produced of a mixture of polyamide and molybdenum.

* * * * *